S. H. DODSON.
ACCOUNT REGISTER.
APPLICATION FILED FEB. 13, 1911.
1,165,948.
Patented Dec. 28, 1915.
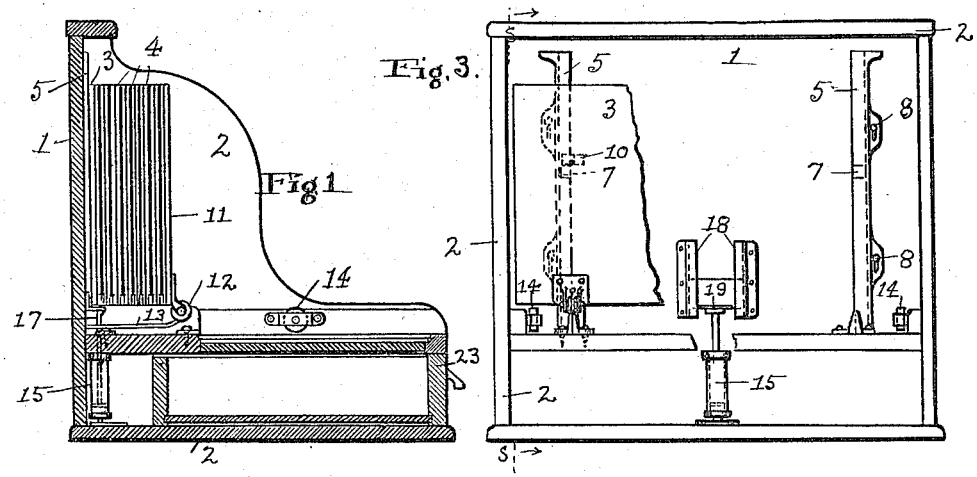
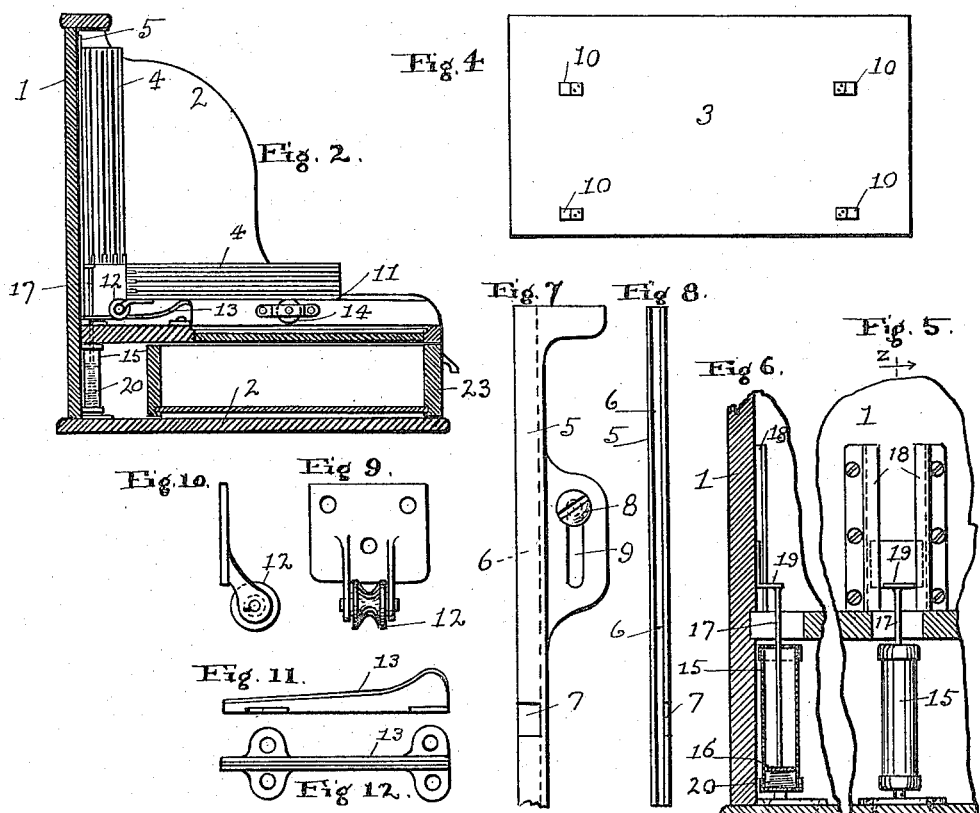
Witnesses:
Mary S. Tooker
Mary Schulte
Inventor:
Samuel H. Dodson
by Wilson, Wilson & Rice
Attorneys.
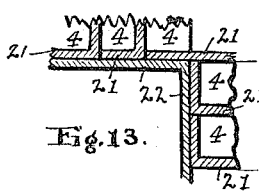
COLUMBIA PLANOGRAPH CO., WASHINGTON, D. C.

UNITED STATES PATENT OFFICE.

SAMUEL H. DODSON, OF GRAND RAPIDS, MICHIGAN, ASSIGNOR, BY MESNE ASSIGNMENTS, TO THE McCASKEY REGISTER COMPANY, (INCORPORATED IN 1914,) OF ALLIANCE, OHIO, A CORPORATION OF OHIO.

ACCOUNT-REGISTER.

1,165,948.  Specification of Letters Patent.  Patented Dec. 28, 1915.

Application filed February 13, 1911. Serial No. 608,322.

*To all whom it may concern:*

Be it known that I, SAMUEL H. DODSON, a citizen of the United States, residing at Grand Rapids, in the county of Kent and State of Michigan, have invented new and useful Improvements in Account-Registers, of which the following is a specification.

My invention relates to account registers, and its object is to provide a mechanism of that character improved in certain respects hereinafter set forth, and which shall be simple and economical in construction and easy and effective in operation. This object is attained by, and my invention finds an embodiment in, the account register hereinafter described, illustrated by the accompanying drawings, in which:—

Figure 1 is a vertical sectional view of such an account register on a plane corresponding to line s—s of Fig. 3: Fig. 2 is a like view showing some of the leaves in reclined position: Fig. 3 is a front view of the rear part of the same, the drawer 23 and the leaves (excepting the back leaf) being removed, and certain parts being broken away: Fig. 4 is a rear view of the back leaf: Fig. 5 is a front view of the air cushion device and connected parts: Fig. 6 is a vertical section thereof on line z—z of Fig. 5: Fig. 7 is a front view of the right hand device for detachably and slidably connecting the leaves to the back of the register, the lower portion being broken away: Fig. 8 is a left hand side view of the same: Fig. 9 is a front view of the leaves' supporting roller: Fig. 10 is a side view of the same: Fig. 11 is a side view of the track for such roller: Fig. 12 is a plan view thereof: and Fig. 13 represents in vertical section the flexible connection of the leaves: Figs. 5, 6, 7, 8, 9, 10, 11, 12 and 13 being detail enlarged views.

To the inside of the back 1 of the account register having the body portion 2, is detachably and vertically-slidably attached the back leaf 3 of a series of leaves 4 hinged together, preferably by the flexible connection shown in Fig. 13. This attachment of the back leaf 3 to the back 1 is effected by vertical guides 5, having grooves 6 and slots 7 communicating therewith, and fastened to the back 1 as by screws 8 engaging vertical slots 9 in such guides; the back leaf carries tongues 10 adapted to be inserted into the slots 7 and to move vertically in the grooves 6. The front leaf 11 is provided with the rollers 12 which support the leaves and are adapted to travel on the tracks 13 inclined upwardly toward and also curved upward at their forward ends and fixed on the body 2. As the leaves are raised to their upright position, these rollers move forwardly and upwardly on their tracks (all the leaves being shown in vertical position in Fig. 1), and as all, or some of the leaves (as shown in Fig. 2) are turned to their horizontal position, these rollers travel backward and downward. The hard slamming of the leaves backward is prevented by these upwardly inclined and curved tracks.

When the front leaf is horizontal, and intermediate leaves are being raised or lowered, the front leaf moves forward or back on the roller 14 journaled on the body.

A cylinder 15 has a piston with the head 16 and piston rod 17, whose upper end slides vertically in guides 18 on the back 1 and is provided with a shelf 19 upon which rests the lower edge of the back leaf 3. The cylinder and piston head constitute an air cushion to arrest the too abrupt descent of the leaves when turned to their vertical position. A weak spring 20 raises the piston when the leaves are lowered.

When the leaves are all in vertical position, they may be readily removed from the body of my register by raising the guides 5 on their slot bearings 9 sufficiently to allow the tongues 10 to pass out of the slots 7, the position of such tongues being (in the normal position of the parts shown) always below the slots 7. The hinged connection of the leaves may be formed as particularly shown in Fig. 13. A strip 21 of flexible material, as canvas, is glued to the edge of one leaf 4 and to one side of the next leaf adjacent to its edge, as particularly shown at the angle of said figure. A continuous strip 22 of like material is then glued on these strips 21, and extends along the edges of all the leaves as shown.

Not confining myself to the details of construction shown and described, I claim:

1. In an account register, a body, a series of normally upright leaves hinged together, a track on the body inclined upward toward the forward end, the front leaf of the series having a supporting member adapted to travel on the track.

2. In an account register, a body, a series of normally upright leaves hinged together, a track on the body inclined toward and curved upward at its forward end, the front leaf having a supporting member adapted to travel on the track.

3. In an account register, a series of normally upright leaves hinged together, a vertical guide, and a supporting track inclined upward toward its forward end, the back leaf having a member engaging the guide and the front leaf having a member traveling on the track.

4. In an account register, a body having a back, a plurality of leaves hinged together and adapted to rotate from upright to reclined positions and vice versa, vertical guides for the rear leaf mounted on the back and having slots in their sides intermediate their ends, the rear leaf having tongues adapted to slide in the guides and pass through the slots.

5. In an account register, a body having a back, a plurality of leaves hinged together and adapted to rotate from upright to reclined positions and vice versa, vertical guides for the rear leaf mounted on the back and having slots in their sides intermediate their ends, the rear leaf having tongues adapted to slide in the guides and pass through the slots, the guides being movable vertically on the back to register the slots with the tongues.

6. In an account register, a body, leaves hinged together and adapted to be turned to upright and reclined positions, a back leaf hinged to the adjacent leaf and movable vertically, an air cushion adapted to yieldingly support the back leaf in any of its positions and means for guiding the back leaf in its movements and maintaining it in the plane of movement of the said air cushion.

7. In an account register, a body, leaves hinged together and adapted to be severally turned to upright and reclined positions, a back leaf hinged to the adjacent leaf and movable vertically, and an air cushion adapted to yieldingly support the back leaf in any of its positions and comprising a cylinder, a piston having a piston rod carrying a supporting bearing for said leaf, and a spring pressing the piston upwardly, and maintaining said supporting bearing in contact with the back leaf.

8. In an account register, a body having vertical slide bearings, leaves hinged together and adapted to be severally turned to upright and reclined positions, the front leaf having a supporting member adapted to travel on an outwardly and upwardly curved track on the body, a back leaf hinged to the adjacent leaf and having detachable connections with the slide bearings, and an air cushion adapted to yieldingly support the back leaf, the said slide bearings with which the back leaf is connected being arranged to maintain the leaf in the plane of movements of the air cushion.

9. In an account register, a body having a back, leaves hinged together and adapted to be severally turned to vertical and horizontal positions, a back leaf hinged to the adjacent leaf and movable in a direct line in a vertical bearing on the back, and an air cushion adapted to yieldingly support the back leaf in the line of said bearing.

10. In an account register, a body having a back, leaves hinged together and adapted to be severally turned to vertical and horizontal positions, a back leaf hinged to the adjacent leaf and movable in a direct line in a vertical bearing on the back, and an air cushion adapted to yieldingly support the back leaf in the line of said bearing and comprising a cylinder, a piston having a piston rod supporting said leaf, and a spring pressing the piston upwardly.

11. An account register comprising a plurality of bill-holding leaves united by hinge connections, and means for holding the leaves closed together and in upright position, comprising a vertical guide with which one end leaf engages, and a track with which a projection carried by the other end leaf engages, the track being inclined upward from the horizontal toward the front.

In testimony whereof I have hereunto set my hand in presence of two subscribing witnesses.

SAMUEL H. DODSON.

Witnesses:
MARY SCHULTE,
MARY S. TOOKER.

Copies of this patent may be obtained for five cents each, by addressing the "Commissioner of Patents, Washington, D. C."